Feb. 3, 1925.
M. C. CAIN
RULE PROTRACTOR
Filed Dec. 23, 1921
1,524,730
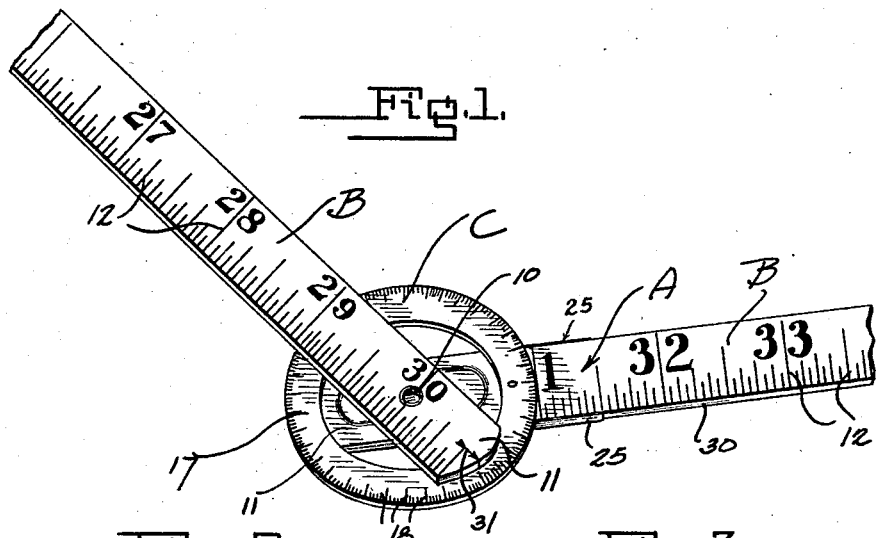
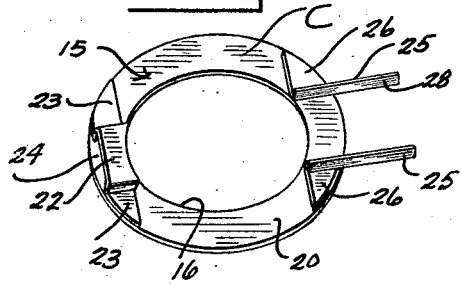
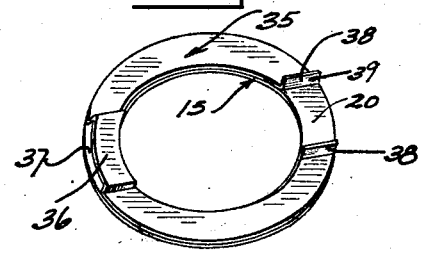
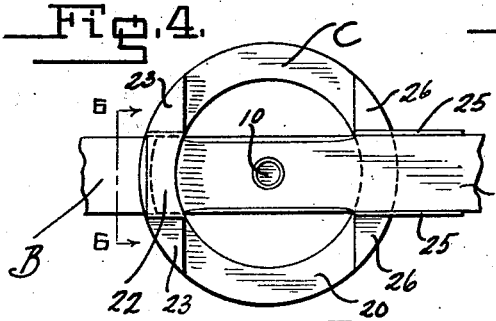
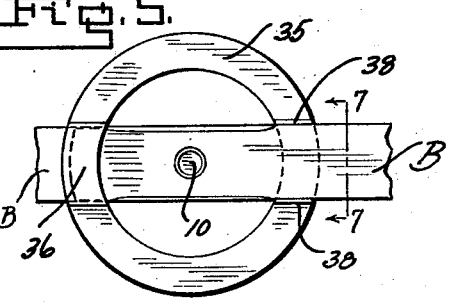
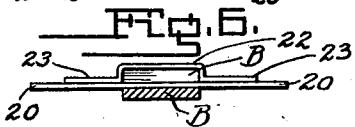
Inventor
Marshall C. Cain
By Lancaster and Allwine
Attorneys Patented Feb. 3, 1925.

1,524,730

UNITED STATES PATENT OFFICE.

MARSHALL CORNELIUS CAIN, OF CLARKSDALE, ARIZONA.

RULE PROTRACTOR.

Application filed December 23, 1921. Serial No. 524,471.

*To all whom it may concern:*

Be it known that I, MARSHALL C. CAIN, a citizen of the United States, residing at Clarksdale, in the county of Yavapai and State of Arizona, have invented certain new and useful Improvements in Rule Protractors, of which the following is a specification.

This invention relates to improvements in protractors adapted for use in connection with folding rules.

The primary object of the invention is the provision of a protractor device of novel formation adapted for use in connection with the ordinary folding measure rule, and which may be mounted concentric with a pivotal point of connection of cooperating rule measuring members and for determining the accurate angular relation of said rule measuring members.

A further object of the invention is the provision of a protractor arrangement of the above described character, which is simple in construction, durable, easy to manufacture, and which may be assembled to a pair of pivotally connected cooperating rule measuring members in a facile manner for determining the angular relation of said rule measuring members.

In the drawing, wherein similar reference characters designate corresponding parts throughout the several views:

Figure 1 is a perspective view of a pair of pivotally connected measuring parts of an ordinary foldable rule, showing the improved protractor member mounted thereon for determining angular relation of said rule parts.

Figure 2 is a perspective view showing the means by which the preferred type of protractor device is attached to a measuring rule.

Figure 3 is a perspective view showing the modified means by which the improved protractor may be mounted upon a foldable rule.

Figure 4 is a bottom plan view of the preferred type of protractor illustrated in Figure 2 and showing the same mounted upon the measuring parts of a foldable rule and adjacent a joint of said foldable rule.

Figure 5 is a bottom plan view showing the manner in which the modified form of protracting device illustrated in Figure 3 is assembled to a measuring rule.

Figure 6 is a cross sectional view taken on the line 6—6 of Figure 4.

Figure 7 is a cross sectional view taken on the line 7—7 of Figure 5.

In the drawing, wherein for the purpose of illustration is shown the preferred embodiment of my invention, the letter A designates an ordinary foldable measuring rule including the various measuring rule members or parts B which are pivotally connected to be held in extensible relation to provide a relatively long rule, or which may be folded one upon the other to provide a foldable device, which occupies a relatively small space. The measuring members B of the rule A are pivotally connected at a point 10 by the ordinary spring fastener mechanism. The pivot point 10 is disposed adjacent the ends of a pair of the measuring rule members B, and in such manner that a short portion 11 of each of the members B project for a short distance outwardly of said pivot point 10, and which projecting ends 11 cooperate with various parts of the improved protractor device C to be subsequently described. The indicia 12 are of course provided upon the surfaces of the parts B of the rule A in the ordinary manner.

The protractor arrangement C includes an annular or ring shaped member 15 having a central opening 16 therein. The upper face 17 of the protractor member C is graduated as at 18 circumferentially upon said face, said graduations, of course, radiating from the center of the annular member C and preferably indicate degrees, although any system of angular measurement may be inscribed or provided upon the upper surface 17. The bottom surface 20 of the member 15 is provided with attaching means for mounting said annular member 15 upon a rule measuring member B.

In the mounting of the protractor device C upon the rule A, it is preferred that the ring shaped disc 15 be disposed concentric with the pivot 10 of a pair of pivotally connected members B and intermediate said members. To this end, the bottom 20 of the member 15 is provided with a substantially U-shaped bracket 22, which has the outer flanges or legs 23 thereof soldered or otherwise securely attached upon the bottom surface 20 and adjacent a marginal edge of the annular member 15 in order to provide a flap or opening 24 as formed by the connection of the member 22 in its position upon the bottom 20. The bottom 20 is provided diametrically opposite the bracket 22 with a pair of resilient arms 25, which are soldered thereto by attaching legs 26 extending outwardly therefrom, and in such manner that the spacing of the inside surfaces 28 of the resilient arms 25 is relatively the same as the length of the slot 24 provided by bracket 22. It is preferred that the arms 25 project outwardly from the marginal edge of the protractor member 15 as is clearly illustrated in Figure 2 of the drawings.

In the mounting of the improved protractor arrangement C upon the rule A, the members B of the rule A are slipped through the opening 16 provided by the annular member 15, until the proper joint or point of pivotal connection of the rule A is reached upon which it is desired to mount the device C. The first step in mounting the protractor device C is that of arranging the protractor device as to slip the projecting end 11 of the lowermost rule member B into the opening or slot 24 provided by the bracket 22 of the annular disc 15. In this position, the upper face 17 containing the angular graduations 18 faces the lower surface of the upper rule member B. The spring arms 25 are so positioned as to engage the lateral edges 30 of the lower rule measuring member B. In this manner, the device C is rigidly and detachably mounted upon the lower member B of a rule A, and is so adjusted in position thereon that the center of the opening 16 of the annular disc 15 is concentric with the pivot point 10 which connects the members B of a rule A. As can readily be seen from Figure 1 of the drawings, the outer projecting end 11 of the uppermost rule member B is provided with an arrow or other indicating mark 31, which assumes a determined position with respect to the angular indicia 18 upon relative movement of the rule members B, and whereby the exact angular relation of said members B may be determined.

A modified form of attaching means for the disc 15 is illustrated in Figure 3. This modified form comprehends the provision of a segmental attaching member 35 for mounting upon the bottom surface 20 of the protractor ring 15. The segmental attaching member 35, however, is so shaped, as to provide the upwardly projecting U-shaped portion 36 upon one edge of the ring member 15, and which provides the slot or opening 37 exactly similar to the slot 24 above described. Upwardly projecting flanges 38 upon the ends of the attaching member 35 are so formed that their inner surfaces 39 align with the inner surfaces of the ends of the slot 37, and which arms 38 are positioned diametrically oppositely on the ring member 15 from that of the U-shaped bracket 36. The member 35 may be soldered or otherwise securely attached to the bottom surface 20. The attachment of this modified form of protractor upon the rule A is altogether similar to that above described.

The relatively large circular opening 16 as provided by the improved protractor device C, of course, permits the connecting and wearing mechanism of the rule A at a point of connection of two of the members B to be disposed therein, in such manner as to not interfere in any manner with the efficiency of the rule A, or of operation of the pivotally connected members B in connection with the protractor device C. As can be seen from Figure 1, the ring disc or member 15 is assembled intermediate the top surface and bottom surface of the bottom and top members B respectively, and with the extreme outer end of the upper member B which contains the indicating mark 31 overlying for a short distance the upper surface 17 of the ring 15. Thus, the protractor device C is securely mounted upon one of the rule members B in rigid manner to provide pivotal action of the other member B thereupon, and without liability of accidental detachment or shifting of the protractor arrangement.

From the foregoing, it is obvious that the rule A can be used for various purposes other than mere linear measurements, since by the addition of the protractor device C angular measurements can be accurately determined. This device will be found of great utility in construction work, plumbing work and other trades in which it is desirable to determine angular measurements with a considerable degree of accuracy.

Various changes in the shape, size and arrangement of parts may be made to the forms of the invention herein shown and described without departing from the spirit of the invention or the scope of the appended claims.

I claim:

1. A device of the class described comprising a substantially ring shaped member having indicia on one side thereof and provided upon its opposite side with an attaching bracket adjacent a marginal edge of said ring shaped member to provide a receiving opening, and resilient attaching arms on said last mentioned side of said ring shaped member for cooperation with said receiving opening to detachably mount the protractor device upon a support.

2. A device of the class described comprising a protractor member having indicia on one side thereof, and provided with means mounted upon its opposite side for attaching said protractor member to a support, said means including an attaching opening adjacent one edge of said protractor member and diametrically opposed attaching arms in alignment with the receiving opening.

3. The combination with a foldable measuring rule having the measuring rule members thereof pivotally connected to provide ends one on each member projecting from the pivot point, of an annular shaped protractor member, and means on the bottom of said protractor member for engaging one measuring rule member adjacent its pivot connection with a second rule measuring member to securely mount said protractor member intermediate said rule measuring members, and concentric with the pivot point of said rule measuring members, whereby said second mentioned rule measuring member may be swung on its pivot to indicate various angular positions on said protractor with respect to the rule measuring member on which said protractor is mounted.

4. In a device of the class described, the combination with a pair of pivotally mounted parts of a collapsible linear measure, the ends of said parts projecting outwardly from the pivot point thereof, of a protractor member of annular shape, said annular shaped member having indicia on one surface thereof, and provided upon its opposite surface with an attaching member providing an opening for slipping over the end of one rule measuring part to concentrically position the annular member with respect to the pivot point of the connected rule measuring members, said attaching member including resilient attaching arms opposed to its opening, and adapted to engage the lateral side edges of the rule measuring member upon which it is mounted, said protractor device when in such position having the annular member disposed intermediate the rule measuring members and whereby the extending end of one of said rule measuring members overlies the indicia of the annular member to assume various positions thereon indicating annular relative positioning of the pivotally connected rule measuring members.

5. A measuring device comprising a pair of pivotally connected sections of a linear measure, a protractor member having a surface thereof delineated to designate degrees, means for attaching the protractor member between said sections of the linear measure with the degree delineations concentric with the pivotal connection of the sections, the other of said sections having an indicator mark thereon for cooperation with the degree delineations of the protractor member.

MARSHALL CORNELIUS CAIN.